United States Patent
Hedstrom (10) Patent No.: US 12,259,035 B2
(45) Date of Patent: Mar. 25, 2025

(54) DRIVE BELT WEAR INDICATION

(71) Applicant: Caterpillar Paving Products Inc., Brooklyn Park, MN (US)

(72) Inventor: Craig Hedstrom, Mounds View, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 301 days.

(21) Appl. No.: 17/721,122

(22) Filed: Apr. 14, 2022

(65) Prior Publication Data

US 2023/0332679 A1    Oct. 19, 2023

(51) Int. Cl.
| | | |
|---|---|---|
| *B60Q 9/00* | (2006.01) | |
| *F16H 7/02* | (2006.01) | |
| *F16H 7/08* | (2006.01) | |
| *F16H 7/10* | (2006.01) | |
| *F16H 7/12* | (2006.01) | |
| *F16H 7/18* | (2006.01) | |
| *F16H 55/17* | (2006.01) | |

(Continued)

(52) U.S. Cl.
CPC ............ *F16H 57/01* (2013.01); *B60Q 9/00* (2013.01); *F16H 7/02* (2013.01); *F16H 7/1281* (2013.01); *G01M 13/023* (2013.01); *F16H 2007/0861* (2013.01); *F16H 2007/0865* (2013.01); *F16H 2007/0876* (2013.01); *F16H 2007/0893* (2013.01); *F16H 2007/0895* (2013.01); *F16H 2057/018* (2013.01)

(58) Field of Classification Search
CPC ..... B60Q 9/00; F16H 7/02; F16H 7/08; F16H 7/10; F16H 7/12; F16H 7/1254; F16H 7/1281; F16H 55/17; F16H 55/171; F16H 55/52; F16H 57/01; F16H 2007/0861; F16H 2007/0865; F16H 2007/0876; F16H 2007/0893; F16H 2007/0895; F16H 2057/018; G01M 13/023
See application file for complete search history.

(56) References Cited

U.S. PATENT DOCUMENTS

| | | |
|---|---|---|
| 5,855,108 A | 1/1999 | Salz et al. |
| 7,975,534 B2 | 7/2011 | McDonald et al. |
| 9,464,697 B2 | 10/2016 | Antchak et al. |

(Continued)

FOREIGN PATENT DOCUMENTS

| | | | |
|---|---|---|---|
| DE | 60120342 T2 * | 10/2006 | ............ F16H 57/01 |
| EP | 3146833 B1 | 6/2019 | |

(Continued)

*Primary Examiner* — Jason D Shanske
*Assistant Examiner* — Daniel M. Keck (57) ABSTRACT

A belt drive for a work machine is disclosed. The belt drive has a drive belt that is wound around an input pulley and an out put pulley. The input pulley is rotated by a motor, and when rotated, transfers rotational motion to the output pulley by the drive belt. A controller is in communication with an input speed sensor that measures the input pulley and an output speed sensor that measures the output pulley. The controller calculates an input speed from the measurement of the input pulley, and an output speed from the measurement of the output pulley. The controller also sends a damaged belt signal to an operator control of the work machine when the output speed is lower by a predetermined threshold than the input speed.

19 Claims, 8 Drawing Sheets

(51) Int. Cl.
  *F16H 57/01*  (2012.01)
  *G01M 13/023*  (2019.01)

(56)  References Cited

U.S. PATENT DOCUMENTS

| | | | |
|---|---|---|---|
| 10,502,287 B2 | 12/2019 | Petridis et al. | |
| 2009/0303065 A1* | 12/2009 | Lipowski | F16G 1/28 340/679 |
| 2010/0131232 A1 | 5/2010 | Taylor | |
| 2014/0232169 A1* | 8/2014 | Schafer | F16H 7/02 299/10 |
| 2021/0010213 A1* | 1/2021 | Schlenker | E01C 23/127 |

FOREIGN PATENT DOCUMENTS

| | | | | |
|---|---|---|---|---|
| GB | 2049844 A | * | 12/1980 | F16H 9/04 |
| JP | 2004076906 A | | 3/2004 | |
| WO | WO-2008080866 A1 | * | 7/2008 | F01L 1/024 |

* cited by examiner

DRIVE BELT WEAR INDICATION

TECHNICAL FIELD

The present disclosure generally relates to a belt drive for a work machine, and more particularly, to detecting a damaged drive belt in a belt drive.

BACKGROUND

Cold planers rotate a drum with cutting bits over a work surface. A motor connected to a drum by way of a belt drive rotates the drum so that the cutting bits alter the work surface. However, in cold planers, and other work machines that utilize belt drives to transmit power from the motor to an accessory, the tension and torque transmission forces as well as operating environment can cause the drive belt to stretch an accumulate damage as the belt ages. These factors create problems with the belt drive such as increased belt slip, improper tensioning, or vibrations due to imbalance. In the case of many work machines, these symptoms of a poorly functioning belt drive are not easily indefinable by the machine operator due to noisy working environments.

U.S. patent application Ser. No. 12/275,273 discloses a meter for measuring belt slip in a belt drive system having at least a belt trained about two rotating elements. The meter has two sensor inputs to receive a digital signal related to the speed of the rotating elements, an external input to accept a command, an output to transmit a measurement or calculation result, and a controller to calculate the relative speed of the two rotating elements to a set-point.

While effective, there remains a need for improved belt drive systems used on work machines high wear applications, such as in the construction industry.

SUMMARY

In accordance with the present disclosure, a belt drive for a work machine is disclosed. The belt drive has a motor that rotates an input pulley, an output pulley, and a belt drive wound around the input pulley and the output pulley. When rotated, the input pulley transmits rotational motion to the output pulley by the drive belt. The belt drive also has an input sensor that makes a measurement of the input pulley, and an output sensor that makes a measurement of the output pulley. A controller receives the measurements and calculates an input speed from the measurement of the input pulley, and an output speed from the measurement of the output pulley. The controller also sends a damaged belt signal to an operator control of the work machine when the output speed is lower by a predetermined threshold than the input speed.

In accordance with another aspect of the present disclosure, a belt drive system for a work machine is disclosed. The belt drive system has a motor that rotates an input pulley, an output pulley, and a belt drive wound around the input pulley and the output pulley. When rotated, the input pulley transmits rotational motion to the output pulley by the drive belt. The belt drive system also has a belt tensioner that has an arm pivotable connected to a belt tensioner base at a first end of the arm. The belt tensioner also has a belt tensioner roller attached to a second end of the arm. A cylinder sensor is connected to the base and the arm, and extends to rotate the arm until the roller is in communication with the belt drive and the belt drive is under tension. A controller receives an extension signal from the cylinder sensor when the cylinder sensor extends beyond a predetermined threshold, and the controller sends a damaged belt signal to an operator control of the work machine when the extension signal is received.

In accordance with a further aspect of the present disclosure, a method of detecting damage in a drive belt is disclosed. The method includes providing a belt drive that has a motor that can rotate an input pulley, and an output pulley. The drive belt is wound around the input pulley and output pulley, and the input pulley transmits rotational motion to the output pulley by the drive belt when the input pulley is rotated. The method further includes utilizing an input sensor to make a measurement of the input pulley and an output sensor to make a measurement of the output pulley. After making the measurements, the measurements are received at a controller, and the controller calculates an input speed from the measurement of the input pulley and an output speed from the measurement of the output pulley. The controller then sends a damaged belt signal to an operator control of a work machine when the output speed is lower by a predetermined threshold than the input speed.

These and other aspects and features of the present disclosure will be more readily understood when read in conjunction with the accompanying drawings.

DETAILED DESCRIPTION

Figure 1:
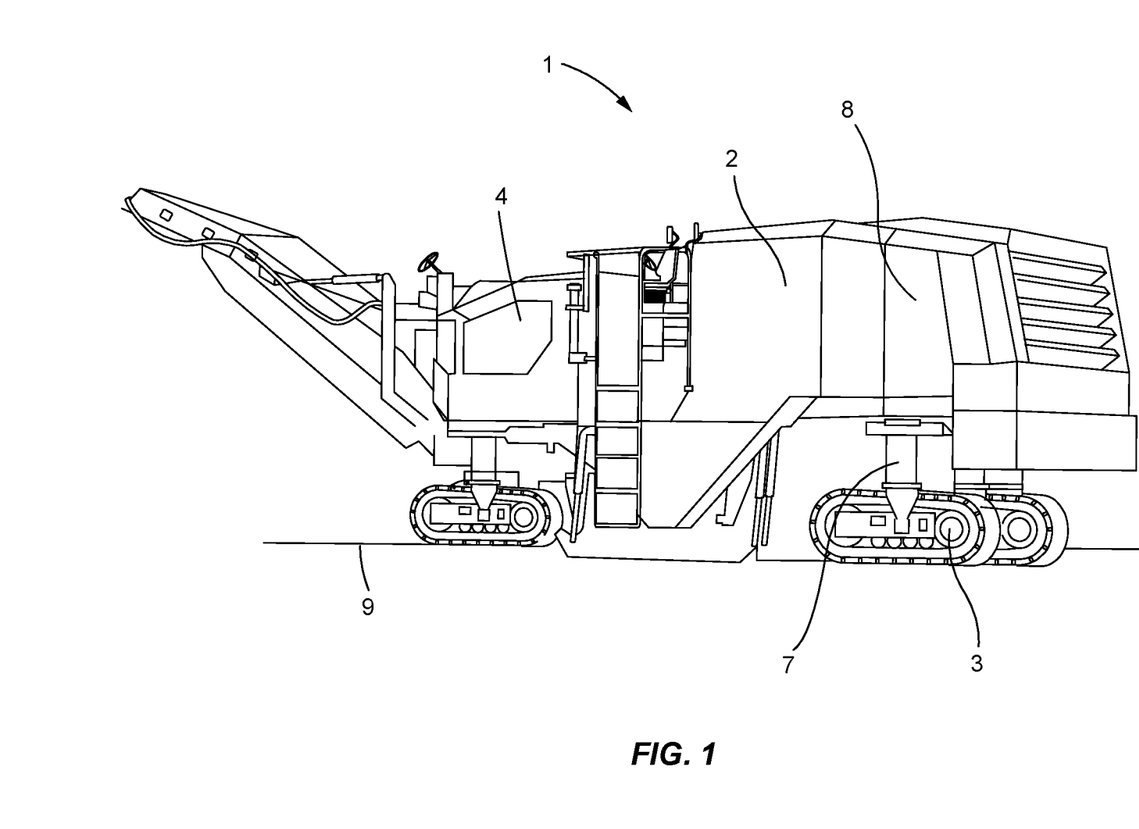
FIG. 1 is a diagrammatic side view of an exemplary cold planer, in accordance with the present disclosure.

Turning now to a more detailed description of the principles set forth herein, FIG. 1 illustrates a work machine 1. The work machine 1 may embody a fixed or mobile machine that performs some type of operation associated with an industry such as construction, mining, farming, transportation, or any other industry known in the art. Although in the exemplary embodiment depicted in FIG. 1, the work machine 1 is depicted as a cold planer, the work machine 1 may include any work machine in the construction industry. For example, the work machine 1 may be an earth moving machine such as an electric rope shovel, a backhoe, an excavator, a dozer, a loader, a motor grader, or any other earth moving machine.

Figure 2:
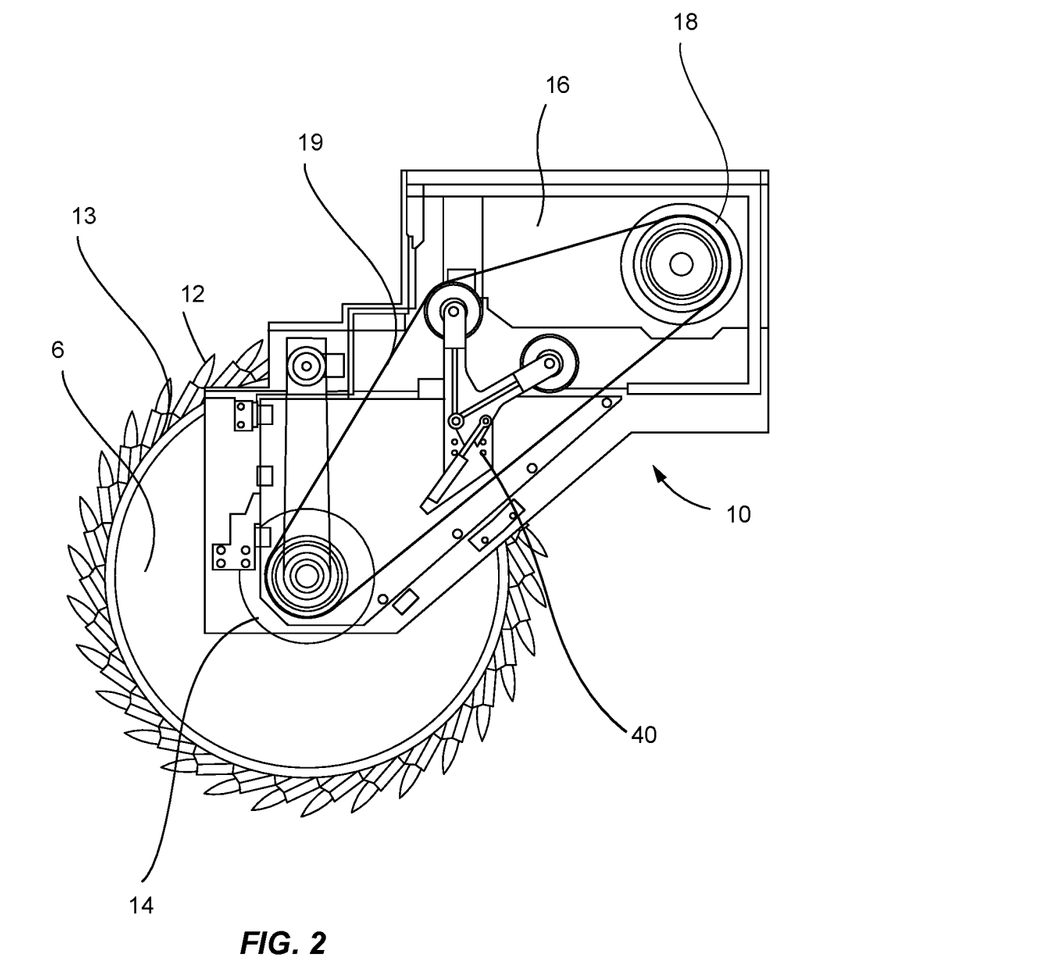
FIG. 2 is a diagrammatic view of an exemplary belt drive system that may be used with the exemplary cold planer of FIG. 1, in accordance with the present disclosure.

Work machine 1 may include a frame 2 connected to one or more traction units 3. As depicted in FIG. 1, the frame 2 is supported on traction units 3. An operator cab 4 containing an operator control 5 (FIG. 6) is supported on the frame 2. A drum 6 (as shown in FIG. 2), or milling drum, is supported from the frame 2 at a general center of the work machine 1 between the traction units 3. Traction units 3 may each include either a wheel or a track section that is pivotally connected to frame 2 by a lifting column 7. Lifting columns 7 may be adapted to controllably raise, lower, and/or tilt frame 2 relative to the associated traction units 3. A power source 8 (such as an engine) may be configured to electrically, mechanically, hydraulically, and/or pneumatically power traction units 3, milling drum 6, and lifting columns 7.

A cold planer, such as the cold planer depicted in FIG. 1, may be defined as a machine used to remove layers of hardened asphalt from an existing roadway surface 9. A cold planer may also be used to remove lime-based cement, concrete, or other roadway materials from the roadway surface 9. Asphalt may be defined as a mixture of aggregate and asphalt cement. Asphalt cement may be a solid or semi-solid mixture of bitumen obtained as a byproduct of petroleum distillation. The asphalt cement may be heated with the aggregate for use in paving roadway surfaces, where the mixture hardens upon cooling.

Turning to FIG. 2, a belt drive system 10 of the work machine 1 is shown. The belt drive system 10 includes components rotated by the power source 8 in order to drive an accessory 15, such as a gearbox 11 (shown in FIG. 3) or the drum 6. Although in FIG. 2 the accessory 15 being driven by the belt drive system 10 is the gearbox 11 which drives the drum 6, any accessory 15 known to be driven by a belt drive system on a construction machine may be included, such as an alternator, a power steering pump, an air conditioning compressor, and a water pump (not shown) to name a few. In the FIG. 2 exemplary embodiment, the drum 6 is driven by the gearbox 11, which itself is driven by the belt drive system 10, for the fragment and removal of chunks of asphalt and/or other material from the road surface 9. Specifically, drum 6 may include one or more spiraling rows of cutting tools 12 operatively connected to an outer cylindrical surface 13 of the drum 6.

Figure 3:
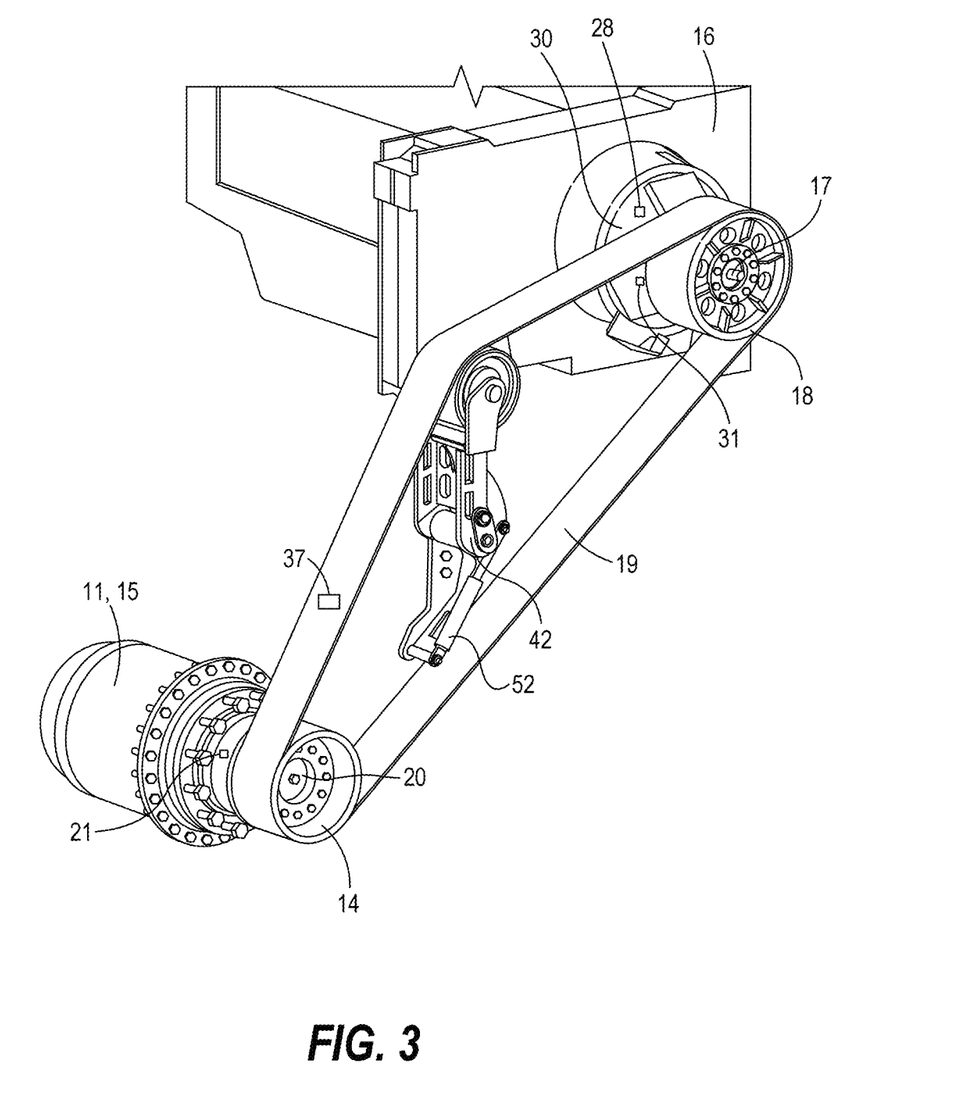
FIG. 3 is a diagrammatic perspective view of the exemplary belt drive system, in accordance with the present disclosure.

The belt drive system 10 includes power transmission components responsible for transferring power (including motion and rotation motion) from the power source 8 to an output pulley 14, and the output pulley 14 transferring power to an accessory 15 (such as gearbox 11 or drum 6). For example, as shown in FIGS. 2-3, includes a motor 16, such as the power source 8 being a primary motor or a secondary motor of the work machine 1, rotates a shaft 17 (such as a crankshaft or driveshaft) that is attached to an input pulley 18. The belt drive system 10 further includes the output pulley 14 and a drive belt 19 wound around the input pulley 18 and the output pulley 14. The motor 16 rotates the shaft 17 which in turn rotates the input pulley 18, which is the driven pulley. When the input pulley 18 is rotated, the drive belt 19 is rotated with it, which in turn rotates the output pulley 14 (the driven pulley). Thus, the input pulley 18 transmits rotational motion to the output pulley 14 by the drive belt 19 when the input pulley 18 is rotated.

The motor 16 may be any type of motor known in the art, such as a hydraulic, pneumatic, or electric motor. In embodiments where the motor 16 is a hydraulic or pneumatic motor, power source 8 pressurizes fluid that is subsequently directed through the motor 16. In embodiments where the motor 16 is an electric motor, power source 8 may generate electricity that is subsequently directed through the motor 16.

The drive belt 19 and the output pulley 14 may operatively connect the motor 16 to the gearbox 11. Drive belt 19 may be v-shaped, flat, corrugated, cog-type, or even chain if desired. The drive belt 19 may have corresponding geometry that meshes with the output pulley 14, and/or the input pulley 18, to transfer torque with little or no slipping. Drive belt 19 may transmit power from the motor 16 to the gearbox 11 by using friction to rotate the output pulley 14. The output pulley 14 may be connected to an accessory shaft 20 of the accessory 15, such as gearbox 11, by way of a bolted flange and/or a keyed slot.

In one exemplary embodiment, the input pulley 18 and the output pulley 14 may be the same size. This allows for an equal one to one transfer of rotational motion from the input pulley 18 to the output pulley 14.

The gearbox 11 may be employed between the input pulley 18 and the drum 6 in order to rotate the drum 6 at a lower speed and a higher torque than those of the input pulley 18. For example, the gearbox 11 may be connected to the input pulley 18 while it rotates at 200 revolutions per minute and the gear box 11 may rotate the drum 6 at 100 rotations per minute. This gearing may allow the drum 6 to be as forceful as is necessary to remove chunks of asphalt and/or other material from the roadway surface 9. The gearbox 11 may include any number of gears arranged in any configuration (such as simple, compound, planetary, etc.). Gearbox 11 may also include an output shaft (not shown) connected to the drum 6, and one or more input shafts (not shown) connected to a gear train.

Figure 4:
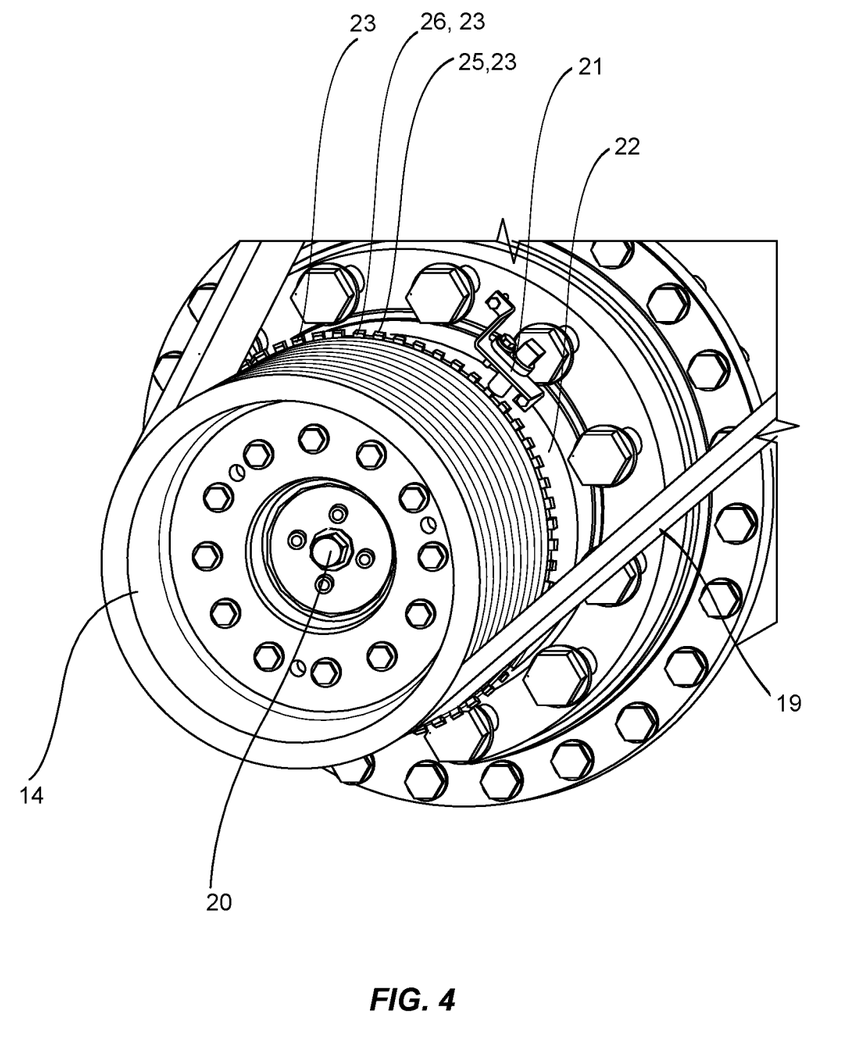
FIG. 4 is a diagrammatic view of the output pulley of the exemplary belt drive system, in accordance with the present disclosure.

As best shown in FIG. 4, the belt drive system 10 may further include an output sensor 21 used to make a measurement of the output pulley 24. As shown, the output sensor 21 is attached to a stationary rim 22 of the gearbox 11. In a further embodiment, the output sensor 21 is attached to any accessory of the belt drive system 10. The output sensor 21 may be attached at any location on the accessory 15, or gearbox 11, as long as it is capable of detecting a tooth 23 of the of the output pulley 14 as it rotates past the output sensor 21. The output sensor 21 is a non-contact sensor, such as optical, infrared, or laser sensor that is sensitive to detecting each of the protruding teeth 23 that are evenly spread around the circumference of the output pulley 14. In one exemplary embodiment, the output pulley 14 has two or more teeth 23, and the measurement of the of the output pulley 24 is a measurement of time between detecting a first tooth 25 of the two or more teeth 23 and a second tooth 26 of the two or more teeth 23 by the output sensor 21. Further, the output sensor 21 may continuously make the measurements between each consecutive teeth 23 as they are rotated past the output sensor 21. As discussed below, the output sensor 21 sends the measurement of the output pulley 24, and any associated data, to a controller 27.

Similarly to the output sensor 21, FIG. 3 depicts the belt drive system 10 may further include an input sensor 28 used to make a measurement of the input pulley 29. As shown, the input sensor 28 is attached to a motor rim 30 of the motor 16. In a further embodiment, the input sensor 28 is attached at any location on the motor 16, as long as it is capable of detecting a tooth 31 of the of the input pulley 18 as it rotates past the input sensor 28. The input sensor 28 is a non-contact sensor, such as optical, infrared, or laser sensor that is sensitive to detecting each of the protruding teeth 31 that are evenly spread around the circumference of the input pulley 18. In one exemplary embodiment, the input pulley 18 has two or more teeth 31, and the measurement of the of the input pulley 18 is a measurement of time between two subsequent teeth 31, similarly as described above with regards to the measurement of the output pulley 24. Further, the input sensor 28 may continuously make the measurements between each consecutive teeth 31 as they are rotated past the input sensor 28. As discussed below, the input sensor 28 sends the measurement of the input pulley 29, and any associated data, to the controller 27.

Figure 6:
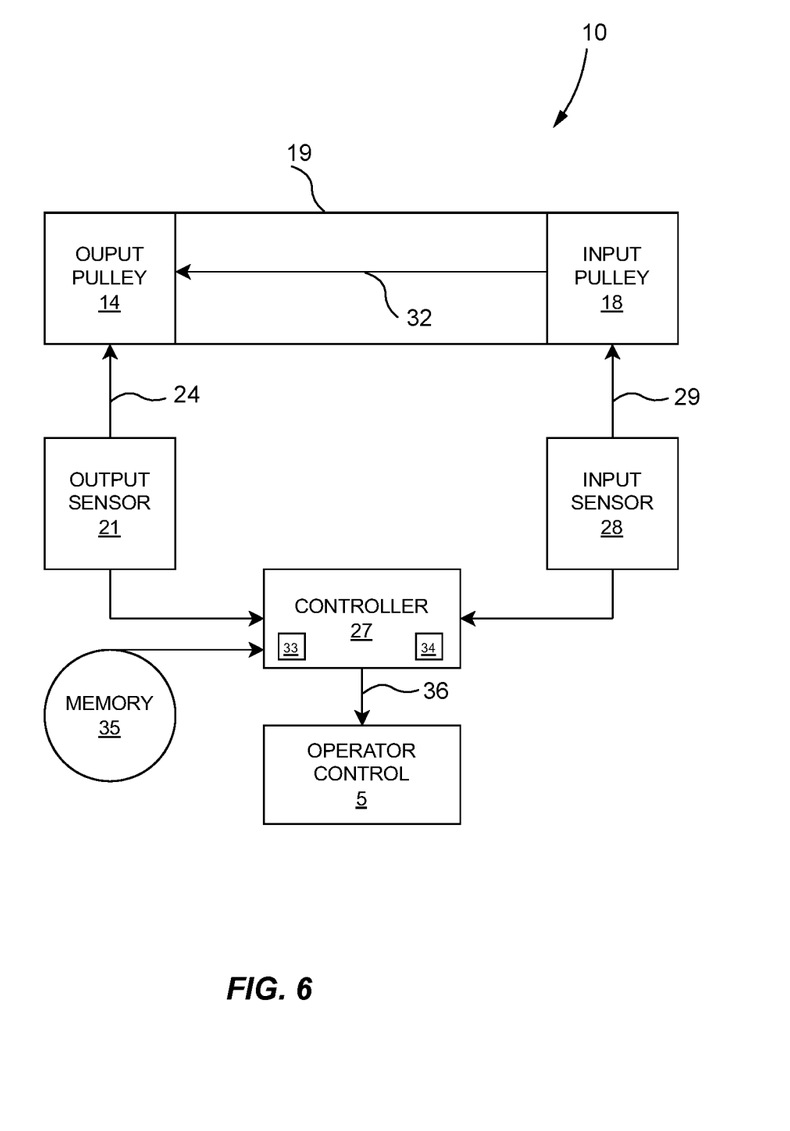
FIG. 6 is a block diagram of the exemplary belt drive system of FIG. 2, in accordance with the present disclosure.

Turning to FIG. 6, a schematic block diagram of the belt drive system 10, in part, is shown. The belt drive system 10 is designed to detect is the drive belt 19 is damaged, such as being worn or stretched. As shown, the input pulley 18 transfers rotational motion 32 to the output pulley 14 by the drive belt when the input pulley 18 is rotated. When the input pulley 18 is rotating, in input sensor 28 makes the measurement of the input pulley 29, and the output sensor 21 makes the measurement of the output pulley 24. The controller 27 is in operative communication with the input sensor 28 and the output sensor 21, and the measurements are sent to and received at the controller 27.

The controller 27, calculates an input speed 33 from the measurement of the input pulley 28, and calculates an output speed 34 from the measurement of the output pulley 24. In one exemplary embodiment, the calculation of the input speed 33 is a calculation of how many times the input pulley 18 is rotating per minute (RPM) and the calculation of the output speed 34 is a calculation of how many times the output pulley 14 is rotating per minute (RPM). The controller 27 then compares the input speed 33 to the output speed 34. When the input speed 33 is equal or substantially equal to the output speed 34, this indicates that the there is no slippage, or very little slippage, of the drive belt 19 and most of the of the rotational motion is being transferred from the input pulley 18 to the output pulley 14. However, when the output speed 34 is lower by a predetermined threshold than the input speed 33, this indicates that the drive belt 19 is damaged. The drive belt may be damaged by being worn, partially worn, torn, or stretched. The predetermined threshold varies depending on the length of the drive belt 19, and the diameter of the input pulley 18 and the output pulley 14, but generally would be set a level at which would indicate that the drive belt 19 is damaged due to a significant amount of rotational motion is not being transferred from the input pulley 18 to the output pulley 14. In one exemplary embodiment, the output sensor 21 and the input sensor 28 continuously make their measurements 24, 29 as the output pulley 14 and input pulley 18 are rotated, the controller 27 continuously calculates the output speed 34 and the input speed 33.

After the controller 27 determines that the output speed 34 is lower by the predetermined threshold than the input speed 33, the controller sends a damaged belt signal 36 to the operator control 5. Once received at the operator control 5, an indication is shown on the operator control 5 that the drive belt 19 is damaged. This indication may be a status symbol, a light bulb, a symbol, text, displayed on a screen on the operator controls or elsewhere in the operators cab 4.

Still referring to FIG. 6, in one exemplary embodiment, the belt drive system 10 further includes a memory 35 in operative communication with the controller 27. The memory 35 may store such information as the number of teeth 23 on the output pulley 14, the number of teeth 31 of the input pulley 18, the diameters of the input pulley 18 and the output pulley 14, or the length of the drive belt 19 before it is damaged. In this embodiment, the number of teeth 23 on the output pulley 14, and optionally the stored diameter of the output pulley 14, may be used by the controller 27 when calculating the output speed 34 in conjunction with the measurement of the output pulley 24. Further, the number of teeth 31 on the input pulley 31, and optionally the stored diameter of the input pulley 18, may be used by the controller 27 when calculating the input speed 33.

Further referring to FIG. 6 with reference to FIG. 3, when the drive belt 19 has a predetermined length that is stored on the memory 35, the controller 27 can calculate a specific portion of the drive belt 37 (shown in FIG. 3) that is damaged when the output speed 34 is lower by the predetermined threshold than the input speed 33 when the specific portion of the drive belt 37 is in contact with the output pulley 14. This is because the length of the drive belt is known, the controller 27 can calculate what portion of the drive belt 19 is in contact with the output pulley 14 at the time of contact.

Turning back to FIG. 2, the belt drive system 10 may have a tensioning roller 40. The tensioning roller 40 may be used to help maintain tension in the drive belt 19. The tensioning roller 40 may be configured to push a portion of the drive belt 19 away from a direct path between the motor 16 and the output pulley 14, thereby reducing slack in the drive belt 19 and reducing any slipping that may occur between the motor 16, drive belt 19, and input pulley 18. Since the drive belt 19 relies on friction to transmit power, belt tension is required in order to allow for efficient power transmission from the motor 16 to the output pulley 14.

Figure 5:
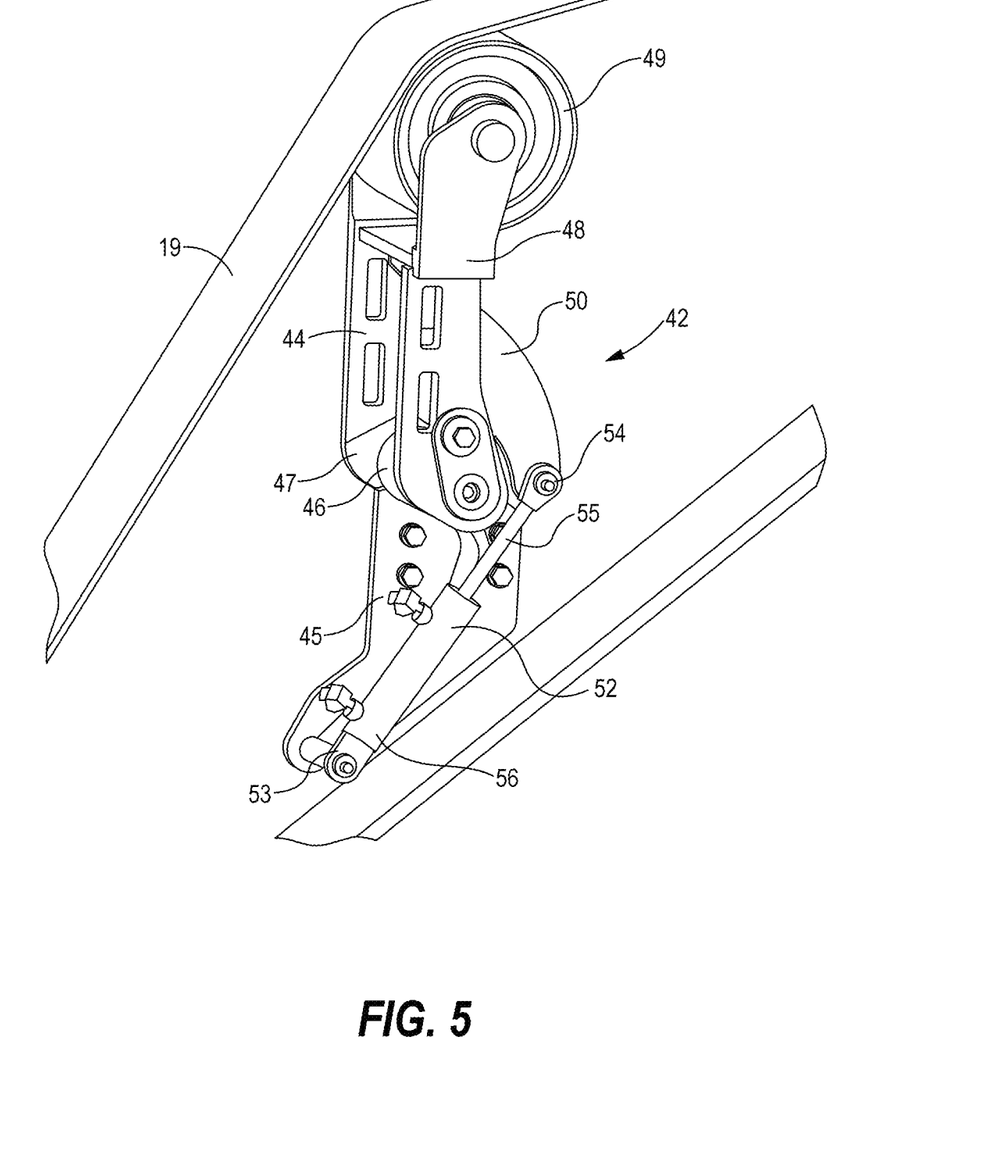
FIG. 5 is a diagrammatic view of an exemplary tension roller to be used in an exemplary belt drive system, in accordance with the present disclosure.

Turning to FIGS. 3 and 5, a type of tensioning roller is shown in the form of a belt tensioner 42 having a cylinder sensor 43. The belt tensioner 42 performs the same role as a tensioning roller, but also is in operative communication with the controller 27 and is configured to detect if the drive belt 19 is damaged. The belt tensioner 42 has an arm 44 that is pivotably connected (pivotable connection 46) to a belt tensioner base 45 at a first end 47 of the arm 44. The belt tensioner base 45 is stationary connected to the work machine 1, but the arm 44 is rotatable in clockwise or counterclockwise direction, relative to the pivotable connection 46. At a second end of the arm 48 a belt tensioner roller 49 is attached to the arm 48. In one exemplary embodiment, the arm 44 further has an arm flange 50 protruding outward from a middle area of the arm 44.

Still referring to FIGS. 3 and 5, a cylinder sensor 52 is connected to the belt tensioner base 45 at a cylinder sensor first end 53 and to the arm 44 (or the arm flange 50) at a cylinder sensor second end 54. The cylinder sensor 52 can extend in order to rotate the pivotably connected arm 44. For example, as shown in the FIG. 5 embodiment, when the cylinder sensor 52 extends, the arm 44 would rotate in the counterclockwise direction, and when the cylinder sensor 52 retreats, the arm 44 would rotate in the clockwise direction. In a further exemplary embodiment, extending of the cylinder sensor 52 cause the arm 44 to rotate in a clockwise direction, and retreating causes counterclockwise rotation. The cylinder sensor 52 is configured to extend until the belt tensioner roller 49 is in communication with the drive belt 19 and the drive belt 19 is under tension.

In one exemplary embodiment, the cylinder sensor 52 is a cylinder actuator that has a rod 55 that is extendable and retractable inside of a cylinder 56 (or piston). The cylinder actuator may be extendable and retractable by an internal jack screw (not shown) or hydraulically driven or actuated by any means known in the art. In this embodiment, the rod 55 extends away from the cylinder 56 to rotate the arm 44.

Figure 7:
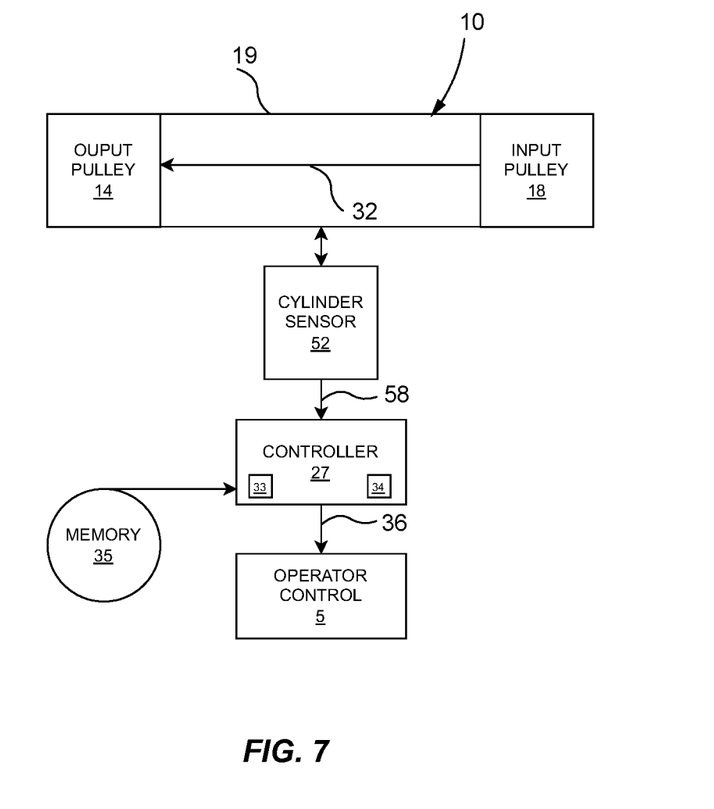
FIG. 7 is a block diagram of another embodiment of the exemplary belt drive system of FIG. 2, in accordance with the present disclosure.

Referring to FIG. 7 a schematic block diagram of another embodiment of a belt drive system 57, in part, is shown. The belt drive system 57 is designed to detect is the drive belt 19 is damaged, such as being worn or stretched. As shown, the input pulley 18 transfers rotational motion 32 to the output pulley 14 by the drive belt when the input pulley 18 is rotated, as shown with the first disclosed embodiment of the belt drive system 10. However, this second embodiment includes the cylinder sensor 52 instead of, or in addition to, the input sensor 18 and the output sensor 14. In this embodiment, the controller 27 is in operative communication with the cylinder sensor 52, and the controller receives an extension signal 58 from the cylinder sensor 52 if the cylinder sensor 52 extends beyond a predetermined threshold. The predetermined threshold varies determining on length of the drive belt 19, but is an extension greater than what is required to place the drive belt 19 under tension. After receiving the extension signal 58, the controller 27 send the damaged belt signal 36 to the operator control 5 of the work machine 1. The damaged belt signal 36 indicating that the drive belt 19 is damaged.

In one exemplary embodiment, the drive belt 19 has a predetermined length, and the controller 19 determines the specific portion of the drive belt 37 that is damaged when the extension signal 58 is sent when the specific portion of the drive belt 37 is in contact with the belt tensioning roller 49.

INDUSTRIAL APPLICABILITY

The disclosed belt drive or belt drive system 10 may be applicable to any cold planer or work machine 1 where an accessory 15 is driven by a drive belt 19, where periodic inspection and/or servicing of the drive belt 19 is desired due to wear of the drive belt 19 from normal operation of the work machine 1.

Figure 8:
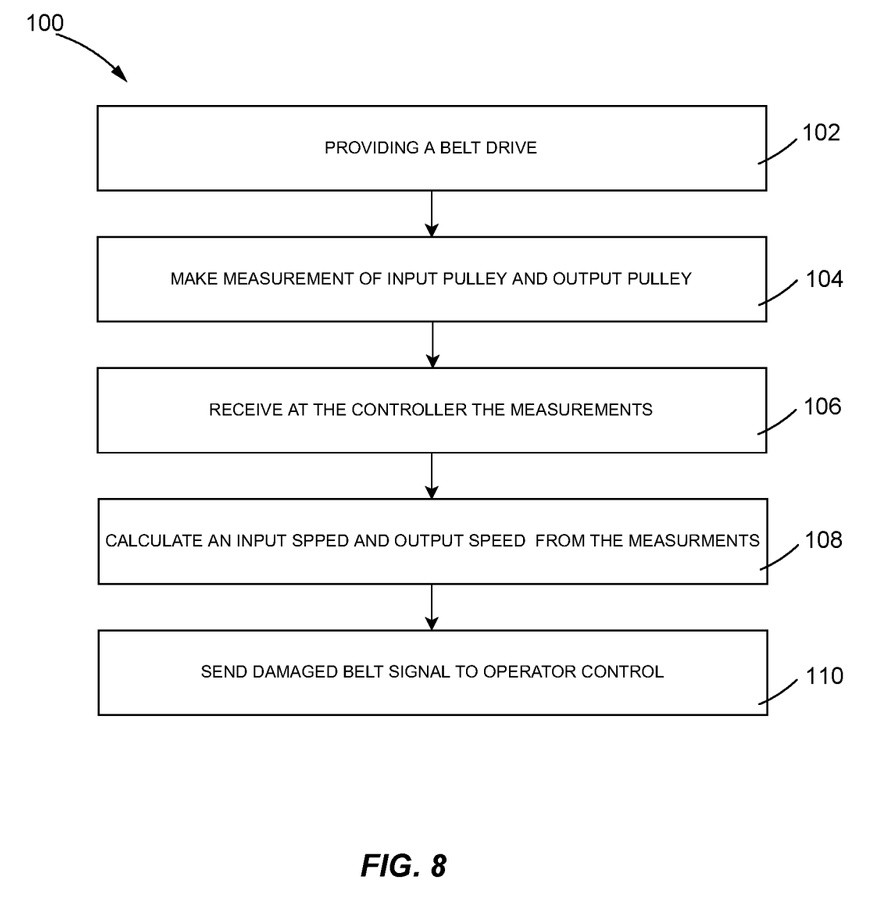
FIG. 8 is a flow chart illustrating a method of detecting a damaged drive belt, in accordance with the present disclosure.

As shown in FIG. 8, with continue reference to FIGS. 1-7, a method of detecting damage in a drive belt is disclosed. In block 102, a belt drive or belt drive system is provided. The belt drive may include a motor 16 that is used to rotate an input pulley 18, and the input pulley transmits rotational motion to an output pulley 14 by a drive belt 19 with the input pulley 18 is rotated. At block 104 an input sensor 28 is used to make a measurement of the input pulley 28, and an output sensor 21 is used to make a measurement of the output pulley 24. At block 106, a controller 27 receives the measurements of the input pulley 29 and the output pulley 24. At block 108, the controller 27 calculates an input speed 33 from the measurement of the input pulley 29, and an output speed 34 from the measurement of the output pulley 24. Then, at block 110, the controller 27 sends a damaged belt signal 36 to an operator control 5 of the work machine 1 when the output speed 34 is lower by a predetermined threshold than the input speed 33.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

What is claimed is:

1. A belt drive for a work machine, the belt drive comprising:
   a motor configured to rotate an input pulley;
   an output pulley;
   a drive belt wound around the input pulley and output pulley, the input pulley configured to transmit rotational motion to the output pulley via the drive belt when the input pulley is rotated;
   a belt tensioner having an arm pivotably connected to a belt tensioner base at a first end of the arm, the belt tensioner further having a belt tensioner roller attached to a second end of the arm;
   an arm flange protruding outward from the arm between the first end and the second end;
   a cylinder actuator connected to a belt tensioner base at a first end and to the arm flange at a second end, the cylinder actuator having a cylinder sensor and the cylinder actuator is configured to:
      extend to rotate the arm flange and arm until drive belt is under tension; and
      retract to rotate the arm flange and arm to decrease tension on the drive belt;
   an input sensor configured to make a measurement of the input pulley;
   an output sensor configured to make a measurement of the output pulley, the output sensor being a non-contact sensor that detects two or more teeth that are evenly spaced around the circumference of the output pulley as they pass in front of the output sensor when the output pulley is rotated;
   a controller in operative communication with the input sensor and the output sensor, the controller configured to receive the measurement of the input pulley and the measurement of the output pulley, calculate an input speed from the measurement of the input pulley, calculate an output speed from the measurement of the output pulley, and send a damaged belt signal to an operator control of the work machine when the output speed is lower by a predetermined threshold than the input speed; and
   the controller further configured to receive an extension signal from the cylinder sensor when the cylinder actuator extends beyond a predetermined threshold, and the controller configured to send the damaged belt signal to the operator control of the work machine when the extension signal is received.

2. The belt drive of claim 1, in which the output speed being lower by the predetermined threshold than the input speed indicating that that the drive belt is worn or stretched.

3. The belt drive of claim 1, in which the drive belt has a predetermined length and the controller is configured to determine a specific portion of the drive belt is damaged when the output speed is lower by the predetermined threshold than the input speed when the specific portion of the drive belt is in contact with the output pulley.

4. The belt drive of claim 1, in which the output speed is a calculation of how many times the output pulley rotates per minute.

5. The belt drive of claim 1, in which the output pulley is attached to an auxiliary shaft of a gearbox of the work machine, and the output sensor is on the gearbox.

6. The belt drive of claim 1, in which the measurement of the output pulley is a measurement of time between detecting a first tooth of the two or more teeth and a second tooth of the two or more teeth by the output sensor.

7. The belt drive of claim 6, in which the output sensor continuously makes the measurements of the output pulley as the output pulley is rotated, and the controller continuously calculates the output speed as the output pulley is rotated.

8. The belt drive of claim 1, in which the number of teeth on the output pulley is stored on a memory in operative communication with the controller, and the controller using the number of teeth on the output pulley and the measurement of the output pulley to calculate the output speed.

9. The belt drive of claim 1, in which the diameter of the output pulley is the same as the diameter of the input pulley.

10. A belt drive system for a work machine, the belt drive system comprising:
- a motor configured to rotate an input pulley;
- an output pulley;
- a drive belt wound around the input pulley and output pulley, the input pulley configured to transmit rotational motion to the output pulley via the drive belt when the input pulley is rotated;
- a belt tensioner having an arm pivotably connected to a belt tensioner base at a first end of the arm, the belt tensioner further having a belt tensioner roller attached to a second end of the arm;
- an arm flange protruding outward from the arm between the first end and the second end;
- a cylinder actuator connected to a belt tensioner base at a first end and to the arm flange at a second end, the cylinder actuator having a cylinder sensor and the cylinder actuator is configured to extend and retract to rotate the arm;
- the cylinder actuator configured to extend to rotate the arm flange and arm until the roller is in communication with the drive belt and the drive belt is under tension;
- a controller in operative communication with the cylinder sensor, the controller configured to receive an extension signal from the cylinder sensor when the cylinder actuator extends beyond a predetermined threshold, and the controller configured to send a damaged belt signal to an operator control of the work machine when the extension signal is received.

11. The belt drive system of claim 10, in which a rod of the of the cylinder actuator extends away from the cylinder actuator to rotate the arm.

12. The belt drive system of claim 11, in which the drive belt has a predetermined length, and the predetermined threshold is any extension of the cylinder sensor beyond the extension of the cylinder actuator to keep the drive belt under tension.

13. The belt drive system of claim 11, in which the damaged belt signal being received at the operator control indicating that that the drive belt is worn or stretched.

14. The belt drive system of claim 10, in which the drive belt has a predetermined length and the controller is configured to determine a specific portion of the drive belt is damaged when the extension signal is sent when the specific portion of the drive belt is in contact with the roller.

15. A method for detecting damage in a drive belt, the method comprising:
- providing a belt drive having a motor configured to rotate an input pulley, an output pulley, and the drive belt wound around the input pulley and output pulley, the input pulley configured to transmit rotational motion to the output pulley via the drive belt when the input pulley is rotated, a belt tensioner having an arm pivotably connected to a belt tensioner base at a first end of the arm, the belt tensioner further having a belt tensioner roller attached to a second end of the arm, an arm flange protruding outward from the arm between the first end and the second end, a cylinder actuator connected to a belt tensioner base at a first end and to the arm flange at a second end, the cylinder actuator having a cylinder sensor, and the cylinder actuator is configured to extend and retract to rotate the arm;
- utilizing an input sensor to make a measurement of the input pulley and an output sensor to make a measurement of the output pulley, the output sensor being a non-contact sensor that detects two or more teeth that are evenly spaced around the circumference of the output pulley as they pass in front of the output sensor when the output pulley is rotated;
- receiving at a controller the measurement of the input pulley and the measurement of the output pulley;
- calculating with the controller an input speed from the measurement of the input pulley and an output speed from the measurement of the output pulley;
- extending the cylinder actuator to rotate the arm flange and arm until the roller is in communication with the drive belt and the drive belt is under tension; and
- sending a damaged belt signal to an operator control of a work machine when the output speed is lower by a predetermined threshold than the input speed and an extension signal is received from the cylinder sensor communicated when the cylinder actuator extends beyond a predetermined threshold.

16. The method of claim 15, in which the damaged belt signal indicating that the drive belt is worn or stretched.

17. The method of claim 15, in which the output pulley is attached to a shaft of a gearbox of the work machine.

18. The method of claim 17, in which the work machine is a cold planer, and the gear box is configured to transfer motion to a drum to rotate the drum during normal operation of the cold planer.

19. The method of claim 18, in which the output sensor is attached to the gearbox.

* * * * *